United States Patent
Marchand et al.

(10) Patent No.: US 12,288,011 B2
(45) Date of Patent: Apr. 29, 2025

(54) METHODS AND SYSTEMS FOR STREAMING BUFFER NUMERICAL PROPAGATION

(71) Applicant: Slingshot Aerospace, Inc., Austin, TX (US)

(72) Inventors: Belinda Grace Marchand, Austin, TX (US); Joshua Lederman, Irvine, CA (US); Daniel Koenig, Austin, TX (US); Matthew Jondrow, Newport News, VA (US)

(73) Assignee: Slingshot Aerospace, Inc., Austin, TX (US)

( * ) Notice: Subject to any disclaimer, the term of this patent is extended or adjusted under 35 U.S.C. 154(b) by 40 days.

(21) Appl. No.: 18/157,720

(22) Filed: Jan. 20, 2023

(65) Prior Publication Data
US 2024/0135055 A1    Apr. 25, 2024

Related U.S. Application Data

(60) Provisional application No. 63/368,954, filed on Jul. 20, 2022, provisional application No. 63/301,919, filed on Jan. 21, 2022.

(51) Int. Cl.
*G06F 30/20*    (2020.01)
*B64G 1/24*    (2006.01)

(52) U.S. Cl.
CPC ............. *G06F 30/20* (2020.01); *B64G 1/242* (2013.01)

(58) Field of Classification Search
CPC ................................ G06F 30/20; B64G 1/242
See application file for complete search history.

(56) References Cited

U.S. PATENT DOCUMENTS

| 6,459,406 B1 | 10/2002 | Tseng et al. |
| 6,813,596 B2 | 11/2004 | Ellis et al. |

(Continued)

FOREIGN PATENT DOCUMENTS

| WO | WO-2021230166 A1 | 11/2021 |
| WO | WO-2022046350 A2 | 3/2022 |

(Continued)

OTHER PUBLICATIONS

Co-pending U.S. Application No. 202318486891, inventors Stricklan; Melanie Dawn et al., filed on Oct. 13, 2023.

(Continued)

*Primary Examiner* — Jack Chiang
*Assistant Examiner* — Brandon Bowers
(74) *Attorney, Agent, or Firm* — Wilson Sonsini Goodrich & Rosati

(57) ABSTRACT

Systems, methods, and instructions of computer-readable media may include obtaining, at a client machine, a user-selected configuration parameter for an orbit simulation; sending, from the client machine to a remote system, via a network connection, a first set of configuration parameters for the orbit simulation, wherein the first set of configuration parameters comprise the user-selected configuration parameter; receiving, at the client device from the remove device, via the network connection, a stream of orbital data comprising points along an orbit, wherein the points along the orbit are determined by the remote system based on the first set of configuration parameters; and presenting, at a display, a dynamic rendering of the orbit simulation, wherein the orbit simulation is based on the stream of orbital data.

60 Claims, 12 Drawing Sheets

(56) References Cited

U.S. PATENT DOCUMENTS

| | | | |
|---|---|---|---|
| 6,895,314 | B2 | 5/2005 | Ailor et al. |
| 7,203,596 | B2 | 4/2007 | Ledingham et al. |
| RE40,800 | E | 6/2009 | Smith |
| 7,557,753 | B2 | 7/2009 | Ailor, III |
| 9,941,967 | B2 | 4/2018 | Welle et al. |
| 10,116,379 | B2 | 10/2018 | Garcia et al. |
| 10,524,159 | B2 | 12/2019 | Xenakis et al. |
| 10,650,687 | B2 | 5/2020 | Dolan et al. |
| 10,659,145 | B2 | 5/2020 | Garcia et al. |
| 10,901,093 | B2 | 1/2021 | Garcia et al. |
| 10,903,899 | B2 | 1/2021 | Baudoin et al. |
| 10,996,340 | B1 | 5/2021 | Utter et al. |
| 11,091,280 | B1 * | 8/2021 | Conn .................. B64G 1/1085 |
| 11,158,943 | B2 | 10/2021 | Bull et al. |
| 11,212,187 | B1 | 12/2021 | Welle |
| 11,267,590 | B2 * | 3/2022 | Ashrafi ................ G01S 7/4816 |
| 11,317,323 | B2 | 4/2022 | Tatum |
| 11,668,834 | B2 * | 6/2023 | Reid ...................... B64G 1/242 |
| | | | 342/357.395 |
| 2004/0024527 | A1 | 2/2004 | Patera |
| 2009/0287364 | A1 | 11/2009 | Burnett et al. |
| 2011/0074767 | A1 * | 3/2011 | Bezy ...................... G06T 19/00 |
| | | | 345/419 |
| 2013/0124079 | A1 | 5/2013 | Olivier et al. |
| 2013/0292517 | A1 * | 11/2013 | Briskman ............... G01S 13/72 |
| | | | 244/158.8 |
| 2015/0134295 | A1 | 5/2015 | Kim et al. |
| 2018/0075099 | A1 | 3/2018 | Park et al. |
| 2019/0007127 | A1 * | 1/2019 | Ward .................. H04L 43/0817 |
| 2021/0261276 | A1 | 8/2021 | Tack et al. |
| 2021/0342669 | A1 | 11/2021 | Godwin, IV et al. |
| 2022/0058922 | A1 * | 2/2022 | Bai ........................ G06N 20/10 |
| 2022/0159544 | A1 | 5/2022 | Gupta |
| 2023/0188203 | A1 | 6/2023 | Hesar et al. |
| 2024/0150045 | A1 | 5/2024 | Stricklan et al. |

FOREIGN PATENT DOCUMENTS

| | | |
|---|---|---|
| WO | WO-2022137341 A1 | 6/2022 |
| WO | WO-2023/141303 A2 | 7/2023 |
| WO | WO-2024102863 A1 | 5/2024 |

OTHER PUBLICATIONS

NASA Ames Research Center, Small Spacecraft Systems Virtual Institute, Small Spacecraft Technology State of the Art, Technical Publication, 327 pages (Oct. 2020).

PCT/US2023/079160 International Search Report and Written Opinion dated Jan. 19, 2024.

FriendlyARM. NanoPi NEO Core2. 5 pages. Accessed online Apr. 2, 2024. Available at URL http://nanopi.io/nanopi-neo-core2.html.

GOMspace. NanoPower P31u. Electrical Power Supply system for small nanosatellites. 4 pages. Accessed online Apr. 2, 2024 at URL https://gomspace.com/shop/subsystems/power/nanopower-p31u.aspx.

Infinity Avionics. Volkh Processing Platform. 3 pages. Accessed online Apr. 2, 2024 at URL https://infinityavionics.com/products/volkh/.

Kongsberg Satellite Services. KSAT Designing Ground Network for Lunar Relay Satellites. Jan. 28, 2022. 3 pages. Accessed Apr. 2, 2024. Available online at URL https://www.ksat.no/news/news-archive/2022/ksat-designing-ground-network-lunar-relay/.

NASA Ames Research Center. State-of-the-Art Small Spacecraft Technology. Small Spacecraft Systems Virtual Institute. NASA/TP-20210021263. 428 pages. (Oct. 2021).

NearSpace Launch. Eyestar Radio. 4 pages. Archived on Jun. 3, 2023 from URL https://nearspacelaunch.com/collections/eyestar-radiosolutions Accessed on Apr. 2, 2024 (Internet Archive WayBack Machine ) at URL https://web.archive.org/web/20230603222357/https://nearspacelaunch.com/collections/eyestar-radiosolutions.

NearSpace Launch. EyeStar-S4 Iridium Enabled Sat-to-Sat Radio. 8 pages. Accessed online Apr. 2, 2024 at URL https://nearspacelaunch.com/eye-star/.

Raspberry Pi Ltd. Raspberry Pi Pico. Data Sheet. Nov. 2023. 6 pages. Accessed online Apr. 2, 2024. Available at URL https://datasheets.raspberrypi.com/pico/pico-product-brief.pdf.

Skinner, et al. Mitigating CubeSat confusion: Results of in-flight technical demonstrations of candidate tracking and identification technologies. Journal of Space Safety Engineering. 9(3):403-409. (Sep. 2022) https://doi.org/10.1016/j.jsse.2022.05.008.

Swift Navigation, Inc. Piksi Multi GNSS Module. 2 pages Archived on Nov. 28, 2022 from URL https://www.swiftnav.com/piksi-multi Accessed on Apr. 2, 2024 (Internet Archive WayBack Machine) at URL https://web.archive.org/web/20221128045817/https://www.swiftnav.com/piksi-multi.

VoCore Studio. VoCore2 The Coin-sized Linux Computer. vocore.io. 14 pages. Accessed online Apr. 2, 2024. Available at URL https://vocore.io/v2.html.

Werner, D. SpaceLink adds smaller satellites to data-relay constellation. SpaceNews. Feb. 24, 2022. 3 pages. Access online at URL https://spacenews.com/spacelink-adds-smaller-satellites-to-roadmap/.

PCT/US2023/011287 International Search Report and Written Opinion dated Aug. 1, 2023.

* cited by examiner

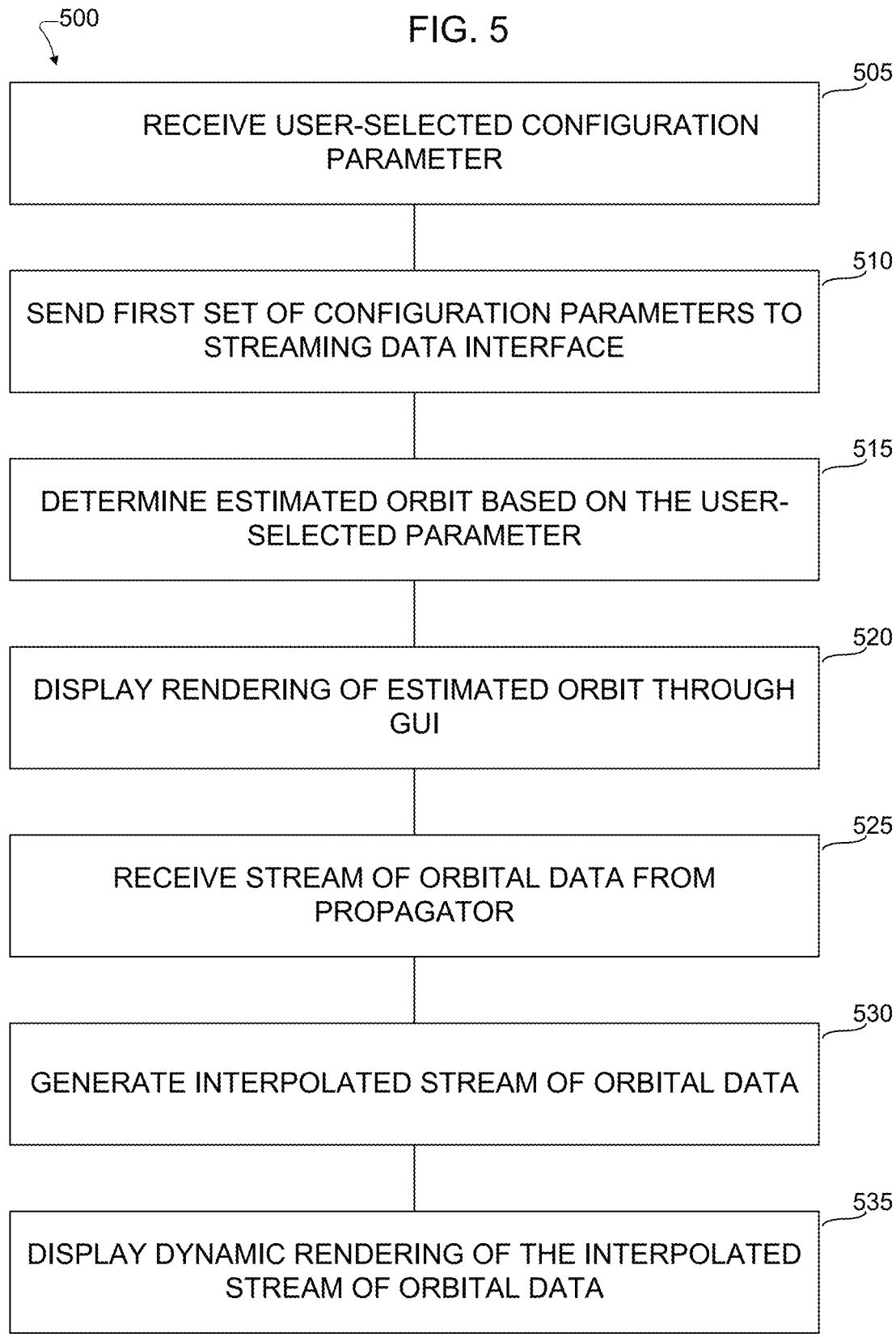

METHODS AND SYSTEMS FOR STREAMING BUFFER NUMERICAL PROPAGATION

CROSS-REFERENCE

This application claims the benefit of U.S. Provisional Application No. 63/301,919, filed Jan. 21, 2022, and U.S. Provisional Application No. 63/368,954, filed Jul. 20, 2022, each of which is entirely incorporated herein by reference.

STATEMENT AS TO FEDERALLY SPONSORED RESEARCH

This invention was made with the support of the United States government under Contract number FA8649-20-9-9147 by U.S. AIR FORCE'S SBIR/STTR CENTER OF EXCELLENCE.

BACKGROUND

Improvements in the per-pound costs of lifting satellites into orbit, as well as the fact that space flight is (depending on the selected start date) in its eighth decade means that the number of objects that, by design or accident, are orbiting the earth continues to grow. The increased volume of orbiting materials presents a growing challenge, as mission planners and other professionals responsible for planning satellite orbits need to design trajectories in a way that avoids collisions in an increasingly crowded space environment, while, at the same time, satisfying predetermined mission criteria, such as geosynchronicity.

Further, exogenous factors, such as global health crises and shifts in employee sentiment, have seen professionals move away from the centralized offices and research facilities providing direct access to high-performance computers capable of performing high dimensional, high accuracy orbital simulations in favor of home or remote workplaces, where they access servers or other workplace computing resources through client computing devices, such as laptops or tablets, which typically do not have the processing power or memory resources to address such simulations without significant latency (e.g., hour-length waits for simulation results), if at all.

SUMMARY

In one embodiment, a method may include receiving, through a graphical user interface (GUI) at a client machine, a user-selected configuration parameter for an orbit simulation to be presented through the GUI, and sending, by the client machine to a streaming data interface, via a network connection, a first set of configuration parameters for the orbit simulation, wherein the first set of configuration parameters comprise the user-selected configuration parameter, and wherein the streaming data interface is communicatively connected to a propagator executing on a host machine. The method further may include determining, at the client machine, an estimated orbit based on the user-selected configuration parameter, displaying, through the GUI, a rendering of the estimated orbit, receiving, via the network connection from the streaming data interface, a stream of orbital data comprising points along an orbit calculated by the propagator based on the first set of configuration parameters, interpolating, at the client machine, the stream of orbital data to determine points along the orbit between the points calculated by the propagator to generate an interpolated stream of orbital data and displaying, through the GUI, a dynamic rendering of the interpolated stream of orbital data.

In another embodiment, a client device may include a display and a processor. The processor is configured to receive, through a graphical user interface (GUI) presented at the display, a user-selected configuration parameter for an orbit simulation to be presented through the GUI, send, to a streaming data interface, via a network connection, a first set of configuration parameters for the orbit simulation, wherein the first set of configuration parameters comprise the user-selected configuration parameter, and wherein the streaming data interface is communicatively connected to a propagator executing on a host machine, determine, an estimated orbit based on the user-selected configuration parameter, display, through the GUI, a rendering of the estimated orbit, receive, via the network connection, from the streaming data interface, a stream of orbital data comprising points along an orbit calculated by the propagator based on the first set of configuration parameters, interpolate the stream of orbital data to determine points along the orbit between the points calculated by the propagator to generate an interpolated stream of orbital data, and display, through the GUI, a dynamic rendering of the interpolated stream of orbital data.

In another embodiment, a non-transitory computer-readable medium contains instructions, which when executed by a processor, cause a client device to receive, through a graphical user interface (GUI) presented at a display, a user-selected configuration parameter for an orbit simulation to be presented through the GUI, send, to a streaming data interface, via a network connection, a first set of configuration parameters for the orbit simulation, wherein the first set of configuration parameters comprise the user-selected configuration parameter, and wherein the streaming data interface is communicatively connected to a propagator executing on a host machine, determine, an estimated orbit based on the user-selected configuration parameter, display, through the GUI, a rendering of the estimated orbit, receive, via the network connection, from the streaming data interface, a stream of orbital data comprising points along an orbit calculated by the propagator based on the first set of configuration parameters, interpolate the stream of orbital data to determine points along the orbit between the points calculated by the propagator to generate an interpolated stream of orbital data, and display, through the GUI, a dynamic rendering of the interpolated stream of orbital data.

In another embodiment, a method may include (a) obtaining, at a client machine, a user-selected configuration parameter for an orbit simulation; sending, from the client machine to a remote system, via a network connection, a first set of configuration parameters for the orbit simulation, wherein the first set of configuration parameters comprise the user-selected configuration parameter; (c) receiving, at the client device from the remove device, via the network connection, a stream of orbital data comprising points along an orbit, wherein the points along the orbit are determined by the remote system based on the first set of configuration parameters; and (d) presenting, at a display, a dynamic rendering of the orbit simulation, wherein the orbit simulation is based on the stream of orbital data.

In another embodiment, a client device, may include a display; and one or more processors configured to: (a) obtain a user-selected configuration parameter for an orbit simulation; (b) send, to a remote system, via a network connection, a first set of configuration parameters for the orbit simulation, wherein the first set of configuration parameters comprise the user-selected configuration parameter; (c) receive, from the remote system, via the network connection, a stream of orbital data comprising points along an orbit, wherein the points along the orbit are determined by the remote system based on the first set of configuration parameters; and (d) present, at the display, a dynamic rendering of the orbit simulation, wherein the orbit simulation is based on the stream of orbital data.

In another embodiment, one or more non-transitory computer-readable media including instructions, which when executed by one or more processors, cause a client device to: (a) obtain a user-selected configuration parameter for an orbit simulation; (b) send, to a remote system, via a network connection, a first set of configuration parameters for the orbit simulation, wherein the first set of configuration parameters comprise the user-selected configuration parameter; (c) receive, from the remote system, via the network connection, a stream of orbital data comprising points along an orbit, wherein the points along the orbit are determined by the remote system based on the first set of configuration parameters; and (d) present, at a display, a dynamic rendering of the orbit simulation, wherein the orbit simulation is based on the stream of orbital data.

Other technical features may be readily apparent to one skilled in the art from the following figures, descriptions, and claims.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede or take precedence over any such contradictory material.

BRIEF DESCRIPTION OF THE DRAWINGS

For a more complete understanding of this disclosure and its advantages, reference is now made to the following description, taken in conjunction with the accompanying drawings, in which:

FIG. 5 illustrates operations of an example method for implementing a data clutch according to certain embodiments of this disclosure.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Developing systems and methods to permit remote configuration and access to numerically integrated, high accuracy orbital simulations with minimal latency, presents a source of technical challenges and opportunities for improvements in the art. This disclosure provides embodiments of a streaming buffer numerical propagator system and methods for providing same.

The systems, the methods, the computer-readable media, and the techniques described herein provide numerous advantages. For example, advantageously, by using a remote system to determine points along an orbit, where the points are then transmitted to a client device, computational efficiency and time efficiency may be improved. In another example, advantageously, because certain embodiments according to this disclosure provide a locally generated orbital estimate, users can more efficiently (e.g., with respect to data transmissions) configure orbital simulations by avoiding waiting for propagations of orbits that, when estimated, are not of interest.

Example Remote Orbital Simulation Device

Figure 1:
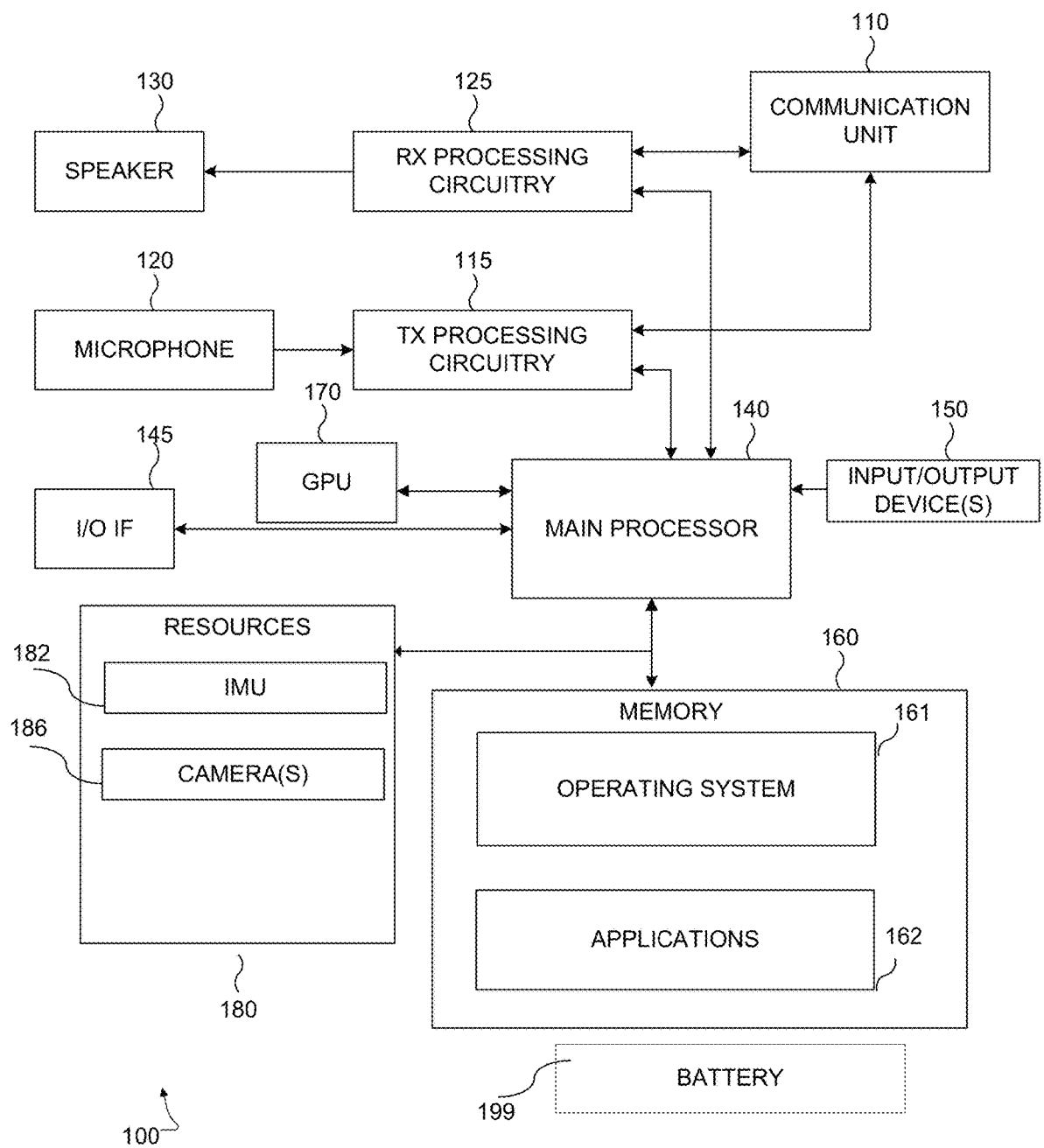
FIG. 1 illustrates an example of a client device according to certain embodiments of this disclosure.

FIG. 1 illustrates a non-limiting example of a device 100 at which a user may remotely configure an orbital simulation and be presented with the results of a remotely performed orbital simulation according to some embodiments of this disclosure. According to various embodiments of this disclosure, the device 100 could be implemented as one or more of a smartphone, a tablet, or a laptop computer. Skilled artisans will appreciate that, in certain embodiments, the device 100 may have more or fewer components than shown in the figure, and that other embodiments of a device comprising a processor, a memory, a network interface, and support for receiving inputs to be provided to a display are possible. The embodiment of the device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 may include a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also may include a speaker 130, a main processor 140, an input/output (I/O) interface (IF) 145, input/output device(s) 150, and a memory 160. The memory 160 may include an operating system (OS) program 161 and one or more applications 162.

The applications 162 can include one or more client applications through which the device 100 can interface with a streaming data interface to which the device 100 is connected over a network interface (e.g., through communication unit 110). According to some embodiments, the resources of the device 100 include, without limitation, the speaker 130, the microphone 120, the input/output devices 150, and additional resources 180.

The communication unit 110 may operate as a network interface for the device 100. For example, the communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal may be sent to the RX processing circuitry 125, which generates a processed baseband signal by filtering, decoding, or digitizing the baseband or IF signal. The RX processing circuitry 125 may transmit the processed baseband signal to the speaker 130 (such as for voice data) or to the main processor 140 for further processing (such as for web browsing data, online gameplay data, notification data, or other message data). Additionally, the communication unit 110 may contain a network interface, such as a network card, or a network interface implemented through software.

The TX processing circuitry 115 may receive analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 may receive the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, or the TX processing circuitry 115. In some embodiments, the main processor 140 may include at least one microprocessor or microcontroller. According to certain embodiments, the main processor 140 may be a low-power processor, such as a processor which may include control logic for minimizing consumption of a battery 199 or minimizing heat buildup in the device 100.

The main processor 140 may also be capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or the applications 162. The applications 162 can include applications specifically developed for the platform of device 100, or legacy applications developed for earlier platforms. The main processor 140 may be coupled to the I/O interface 145, which may provide the device 100 with the ability to connect to other devices such as laptop computers and handheld computers. The I/O interface 145 may be the communication path between these accessories and the main processor 140.

The main processor 140 may be coupled to the input/output device(s) 150. The operator of the device 100 can use the input/output device(s) 150 to enter data into the device 100. The input/output device(s) 150 can include keyboards, touch screens, mouse(s), track balls or other devices capable of acting as a user interface to allow a user to interact with the device 100. In some embodiments, the input/output device(s) 150 can include a touch panel, an augmented or virtual reality headset, a (digital) pen sensor, a key, or an ultrasonic input device.

The input/output device(s) 150 can include one or more screens (e.g., touchscreens), which can be a liquid crystal display, light-emitting diode (LED) display, an optical LED (OLED), an active-matrix OLED (AMOLED), or other screens capable of rendering graphics.

The memory 160 may be coupled to the main processor 140. According to certain embodiments, part of the memory 160 may include a random access memory (RAM), and another part of the memory 160 may include a Flash memory or other read-only memory (ROM). According to certain embodiments, the device 100 can further include a separate graphics processing unit (GPU) 170.

According to certain embodiments, the device 100 may include the additional resources 180, which can, if permitted, be accessed by the applications 162. According to certain embodiments, the additional resources 180 may include an accelerometer or inertial measurement unit (IMU) 182, which can detect movements of the electronic device along one or more degrees of freedom. The additional resources 180 include, in some embodiments, one or more cameras 186 (e.g., complementary metal oxide semiconductor (CMOS) sensor type cameras) of the device 100.

According to various embodiments, the above-described components of the device 100 may be powered by battery 199 (e.g., a rechargeable lithium-ion battery), whose size, charge capacity and load capacity are, in some embodiments, constrained by the form factor and user demands of the device. As a non-limiting example, in embodiments where the device 100 is a smartphone, the battery 199 may be configured to fit within the housing of the smartphone and may be configured not to support current loads (e.g., by running a graphics processing unit at full power for sustained periods) causing heat buildup.

FIG. 1 illustrates one example of the device 100 which can function as a client device for remotely configuring and receiving an orbital simulation. For example, the device 100 may send data (e.g., input parameters) to a server, and receive data (e.g., simulation data) from the server. Various changes may be made to FIG. 1. For example, the device 100 could include any number of components in any suitable arrangement. In general, devices including computing and communication systems come in a wide variety of configurations and FIG. 1 does not limit the scope of this disclosure to any particular configuration. While FIG. 1 illustrates one operating environment in which various features disclosed herein can be used, these features could be used in any other suitable system.

Example Remote Orbital Simulation Server

Figure 2:
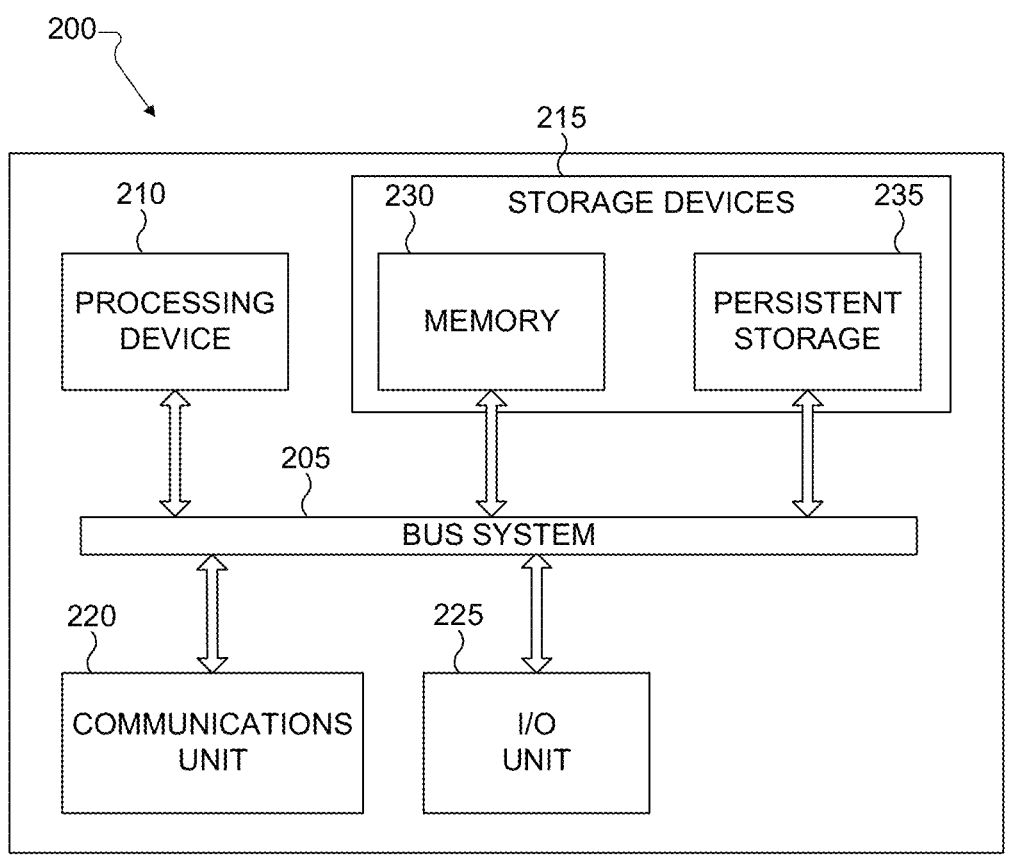
FIG. 2 illustrates an example of a server which can operate as a backend propagator, according to certain embodiments of this disclosure.

FIG. 2 illustrates an example of a server 200 that can be configured to execute an orbital simulation based on a remotely configured propagator according to certain embodiments of this disclosure. The embodiment of the server 200 shown in FIG. 2 is for illustration only and other embodiments could be used without departing from the scope of the present disclosure. According to certain embodiments, the server 200 operates as a computationally powerful remote system with the processing and memory resources for receiving data from one or more client devices (e.g., the device 100 in FIG. 1) and performing a backend numerical integration based orbital simulation, and which can provide a stream of simulation result data over a network to one or more client devices (e.g., the device 100 in FIG. 1).

In the example shown in FIG. 2, the server 200 may include a bus system 205, which supports communication between at least one processing device 210, at least one storage device 215, at least one communications unit 220, and at least one input/output (I/O) unit 225.

The processing device 210 may execute instructions that may be loaded into a memory 230. The processing device 210 may include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of the storage devices 215, which represent any structure(s) capable of storing and facilitating retrieval of information (such as data, program code, or other suitable information on a temporary or permanent basis). The memory 230 may represent a random-access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 may support communications with other systems or devices. For example, the communications unit 220 could include a network interface card or a wireless transceiver facilitating communications over a network. The communications unit 220 may support communications through any suitable physical or wireless communication link(s).

The I/O unit 225 may enable input and output of data. For example, the I/O unit 225 may provide a connection for user input through a keyboard, mouse, keypad, touchscreen, or other suitable input device. The I/O unit 225 may also send output to a display (e.g., a graphical user interface), printer, or other suitable output device.

Example Remote Orbital Simulation Architecture

Figure 3:
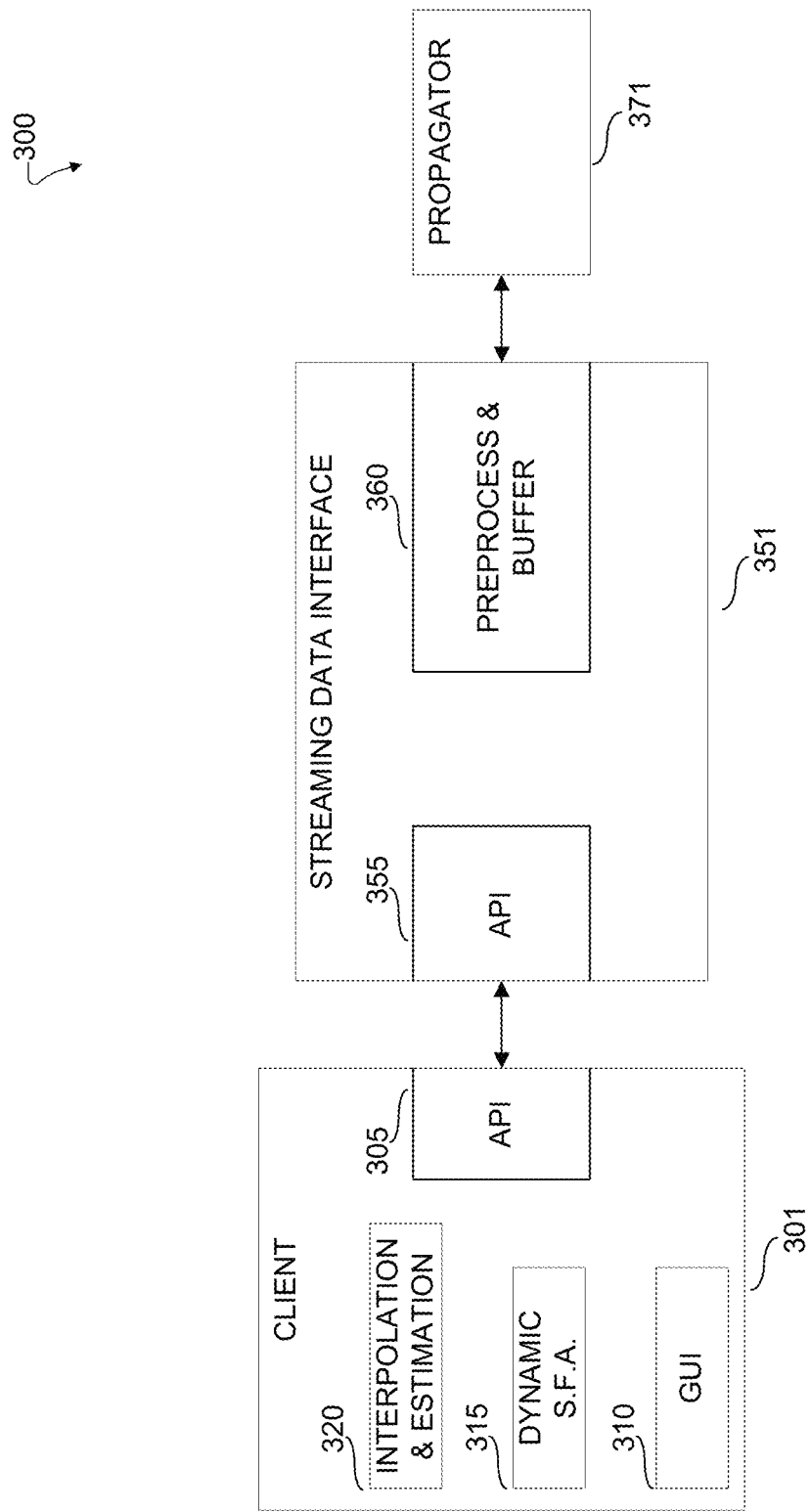
FIG. 3 illustrates an example of an architecture for implementing a streaming buffer propagator system, according to various embodiments of this disclosure.

FIG. 3 illustrates an architecture 300 for configuring, receiving and presenting a stream of orbital simulation data at a client device, according to various embodiments of this disclosure.

Referring to the explanatory example of FIG. 3, in some embodiments, the architecture 300 comprises three computing platforms: a client device 301, a streaming data interface 351 and a propagator 371. The three computing platforms may be communicatively connected (e.g., via a network, hardline connection, etc.). In certain embodiments, the architecture 300 may comprise additional client machines connecting to the propagator 371 through the streaming data interface 351. Similarly, in some embodiments, there may be more than one instance of the propagator 371. Additionally or alternatively, the streaming data interface 351 and the propagator 371 may be implemented at a common device. Further, in some embodiments, the propagator(s) 371 may be implemented on instances of virtual machines. Skilled artisans will appreciate that the architecture 300 may be both flexible and extensible with regarding to the number and types of machines used for a given implementation.

As shown in the explanatory example of FIG. 3, the client device 301 is an instance of a remote device (e.g., the device 100 in FIG. 1), which is connected, via a network interface (e.g., the communication unit 110 in FIG. 1) to one or more devices (e.g., the server 200 in FIG. 2) implementing the streaming data interface 351. In some embodiments, the client device 301 further comprises one or more instances of a connection application programming interface 305 for maintaining a persistent connection between the client device 301 and the streaming data interface 351, thereby avoiding the request-and-response connection approach utilized by HTTP web connections. In some embodiments, the connection API 305 comprises a WebSockets API which establishes a communication session between the client device 301 and the streaming data interface 351. In various embodiments, the connection API 305 comprises a remote procedure call (RPC) API configured for providing microservices, for example, gRPC.

Referring to the explanatory example of FIG. 3, the client device 301 further comprises an application providing one or more graphical user interfaces (GUIs) 310, through which a user can configure, receive and view a stream of orbital simulation data at the client device 301. A non-limiting example of an instance of the GUI 310 is provided with reference to FIGS. 4A-4C of this disclosure.

Systems for performing numerical integration of simulated orbital paths, also referred to herein as propagators, typically present operators with at least two layers of configurable parameters for controlling the simulation. A first layer comprises orbital parameters of the simulation. As used in this disclosure, the expression "orbital parameters" encompasses parameters of a force model describing an orbital path. Examples of orbital factors include, without limitation, the oblateness of the earth, gravitational force from the moon and sun, and atmospheric drag as well as trajectory parameters characterizing the orbiting object's initial position and orientation. A second layer comprises calculation-specific parameters. As used in this disclosure, the expression "calculation-specific parameters" encompasses parameters specifying aspects of how the orbital simulation is to be calculated at a server and animated at the client device 301. Examples of calculation-specific parameters include, without limitation, the choice of integrators, step values and tolerances used by the selected integrator, the start and end dates of the propagation, and the playback speed. Absent advanced academic training in astrodynamics, setting appropriate orbital and calculation-specific parameters can be frustrating to new users or users configuring a simulation across a network to a remote computer. Accordingly, in certain embodiments, the client device 301 comprises one or more software modules implementing a dynamic step function algorithm 315. According to various embodiments, the dynamic step function algorithm 315 determines an optimal number and time spacing of calculation steps for each orbit given the camera angle. In this way, the propagator 371 provides a sufficient number of data points for interpolation and estimation module 320 to present, through the GUI 310, a smooth visual orbit, while at the same time, minimizing the frontend processing load to be performed by interpolation and the estimation module 320.

As shown in the explanatory example of FIG. 3, the client device 301 comprises program code, that when executed by a processor of the device, provides an instance of the estimation and interpolation module 320. According to various embodiments, the estimation and interpolation module 320 is configured to receive orbital parameters for the simulation and locally determine an estimation (e.g., using a two-body model which excludes computationally expensive factors, such as the effects of atmospheric drag and other celestial bodies) of the orbit which can be presented through the GUI 310. Additionally, the estimation and interpolation module 320 is further configured to receive, via the streaming data interface 351 a stream of orbital data from propagator 371. According to various embodiments, the orbital data comprises calculated points along an orbit at predetermined time step intervals (e.g., time step intervals determined by the dynamic step function algorithm 315). In some embodiments, to present an orbital simulation through the GUI 310, points on the orbital trajectory corresponding to times between the time steps of the orbital data received from the streaming data interface 351 need to be determined or interpolated. According to various embodiments, the estimation and interpolation module 320 fits points between the orbital data points provided through streaming data interface 351.

According to various embodiments, the streaming data interface 351 comprises at least the following components, an instance of the connection API 355 and a preprocessing/buffering stage 360. As discussed elsewhere in this disclosure, in certain embodiments, the architecture 300 is both extensible and flexible, and the multiple propagators 371 can connect to the client device(s) 301 through the streaming data interface 351, without any modification of the operation of the propagator 371 or its output. As such, the propagator 371 may output the results of a given simulation as a giant "drop" of data, which exceeds the bandwidth of the connection or, depending on the calculation parameters, in intermittent bites. Accordingly, in various embodiments, the streaming data interface 351 comprises a pre-processing and buffering stage 360, which operates to buffer orbital data received from the propagator(s) 371 such that a steady stream of orbital data can be passed between the streaming data interface 351 and the client device 301. As shown in FIG. 3, the streaming data interface 351 further comprises the one or more connection APIs 355, which, like the connection API 305 at the client device 301, operate to maintain a persistent connection between the client device 301 and the streaming data interface 351.

According to various embodiments, the architecture 300 further comprises the one or more propagators 371, comprising processing platforms (e.g., server 200 in FIG. 2, a cloud, or virtualized equivalents thereof) configured to perform orbital simulations according to one or more computational models. Examples of computational models which may be implemented at the propagator(s) 371 include the J2 propagator model, the J4 propagator model, the Simplified General Perturbation (SGP) mode and the Simplified Deep Space Perturbation (SDP) model.

Example Orbital Simulation Interfaces

FIGS. 4A-4H illustrate an example of configuring and receiving an orbital simulation at a GUI (e.g., the GUI 310 in FIG. 3) provided by a client device (e.g., the client device 301 in FIG. 3), according to various embodiments of this disclosure. For convenience, cross-reference elements common to more than one of FIGS. 4A-4H are numbered similarly. GUI 400 can be implemented on any suitable processing platform (e.g., device 100 in FIG. 1) configured to implement a streaming connection with a streaming data interface (e.g., through the connection API 305 in FIG. 3), as well as an interpolation and estimation module (e.g., the interpolation and estimation module 320 in FIG. 3). Examples of suitable processing platforms include, without limitation, laptop computers, tablets, and smartphones.

Figure 4A:
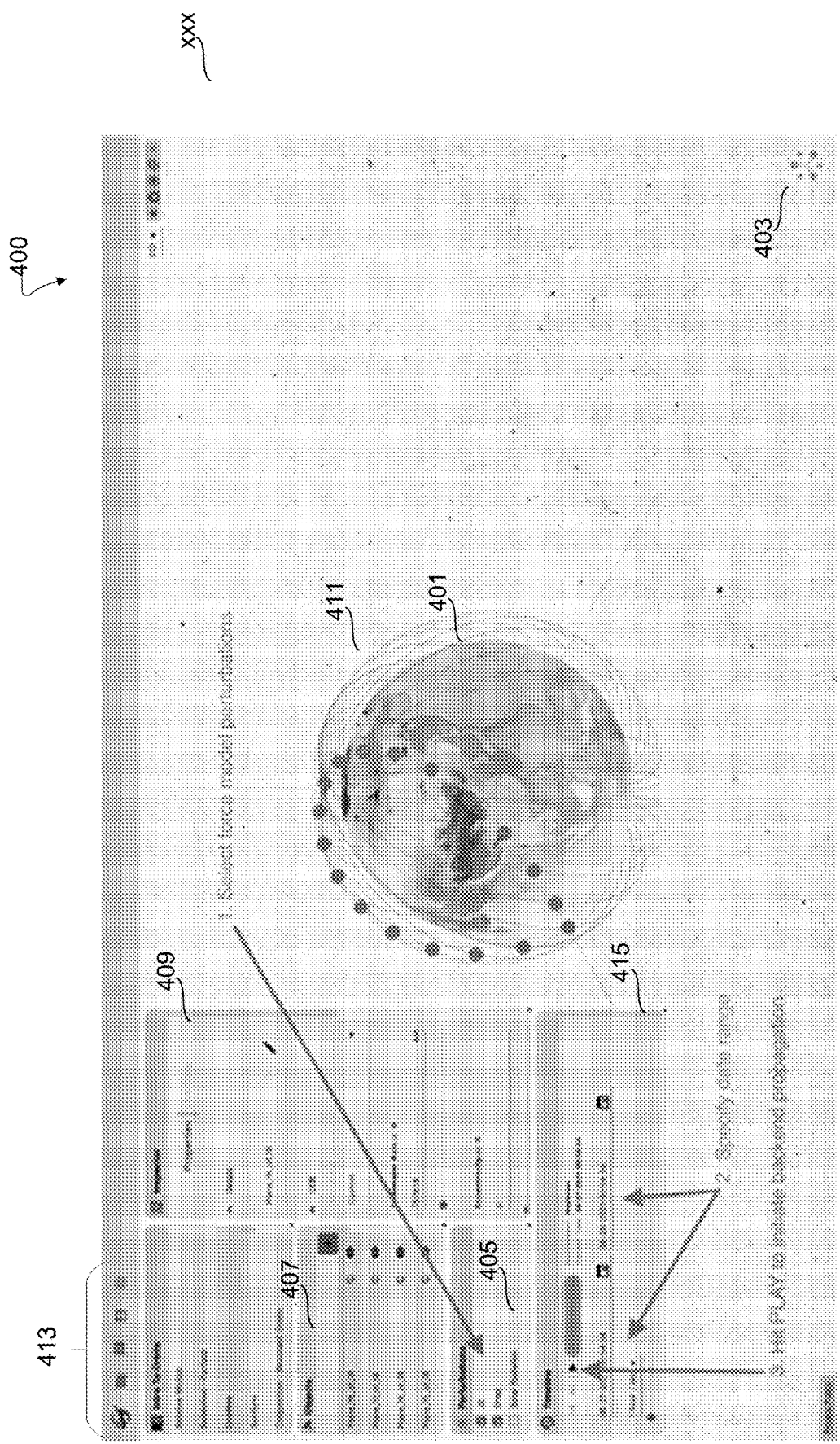
FIG. 4A illustrates an example of a graphical user interface (GUI) for configuring and receiving a buffered stream of orbital data from a backend propagator, according to some embodiments of this disclosure.

Referring to the illustrative example of FIG. 4A, the GUI 400 comprises a view of a central body 401 (in this case, the earth), that can be controlled by a camera widget 403, which permits a user to set camera parameters, such as zoom and viewpoint. According to various embodiments, the GUI 400 further comprises one or more widgets through which a user can specify both orbital parameters and calculation-related parameters. For example, widget 405 allows a user to specify which perturbations are to be considered by the propagator model. Similarly, widget 407 allows the user to specify the type of object to be put into orbit. According to various embodiments, a user can specify one or more orbital parameters, such as the semi-major axis and the inclination of the orbit relative to the earth's equator through widget 409. As shown in FIG. 4A, as the user adjusts the orbital parameters at the GUI 400, an orbital estimate 411 of the orbit is displayed. In certain embodiments, the orbital estimate 411 is generated by the interpolation and estimation module 320 in FIG. 3. According to various embodiments, the local orbital estimate 411 comprises a locally computed (e.g., at the client device) estimation of the orbital path based on a subset of the parameters available for configuration at the GUI 400 using a computationally lightweight, analytical (e.g., a model not premised on step-wise numerical integration) model, such as a Keplerian orbit model.

According to various embodiments, the frontend application providing the GUI 400 may determine initial values of computational parameters (e.g., time step values determined by dynamic time step function algorithm 315 in FIG. 3) automatically, but provide options for further user configuration (e.g., through one of the pull-down menus 413). In certain embodiments, the calculation of the orbit may be performed in an adaptive manner, with the time step values being dependent on the location or curvature of the ellipse, with areas of greater change in the curve of the orbit having smaller time steps.

As shown in FIG. 4A, the GUI 400 further comprises an execution widget 415, through which a user can specify a date range over which a simulation is to be run, and to initiate the process of providing a full set of simulation parameters (e.g., both user-selected and automatically-generated orbital and calculation-related parameters) to one or more backend systems providing a propagator for performing the orbital simulation (e.g., the propagator(s) 371 in FIG. 3).

Figure 4B:
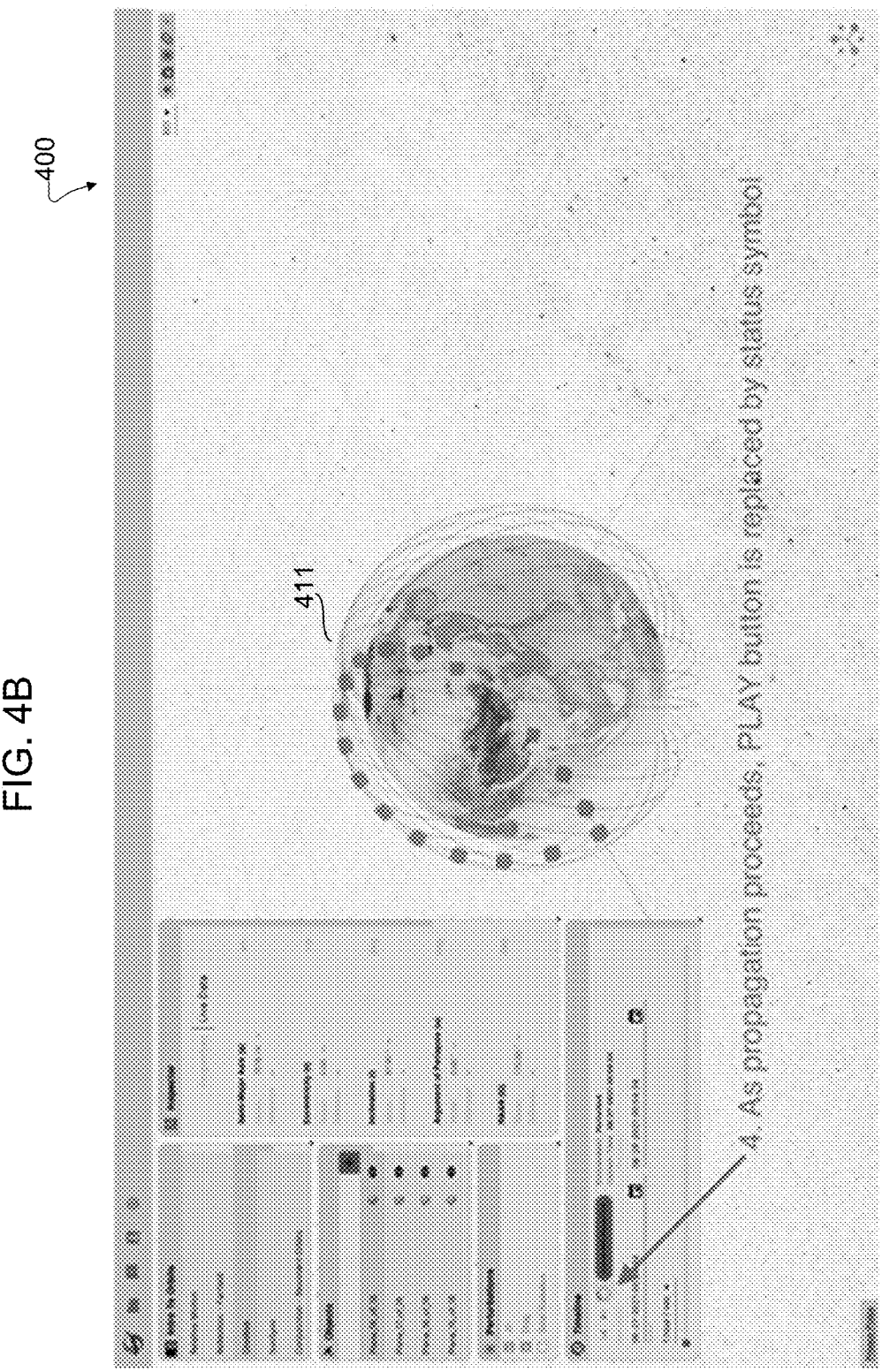
FIG. 4B illustrates another example of a graphical user interface (GUI) for configuring and receiving a buffered stream of orbital data from a backend propagator, according to some embodiments of this disclosure.

Referring to the explanatory example of FIG. 4B, the GUI 400 is shown in an intermediate state, wherein the simulation parameters have been provided, via a streaming data interface (e.g., the streaming data interface 351 in FIG. 3) to a backend propagator, which has initiated numerical integration, but not yet output sufficient orbital data to fill a buffer of the streaming data interface 351 such that a stream of orbital data may be provided to the client device 301. Advantageously, because certain embodiments according to this disclosure provide a locally generated orbital estimate 411, users can more efficiently (e.g., with respect to data transmissions) configure orbital simulations by avoiding waiting for propagations of orbits that, when estimated, are not of interest. In other words, the locally generated orbital estimate 411 provides users with an on-demand visualization of approximately how the final orbital simulation will appear.

Figure 4C:
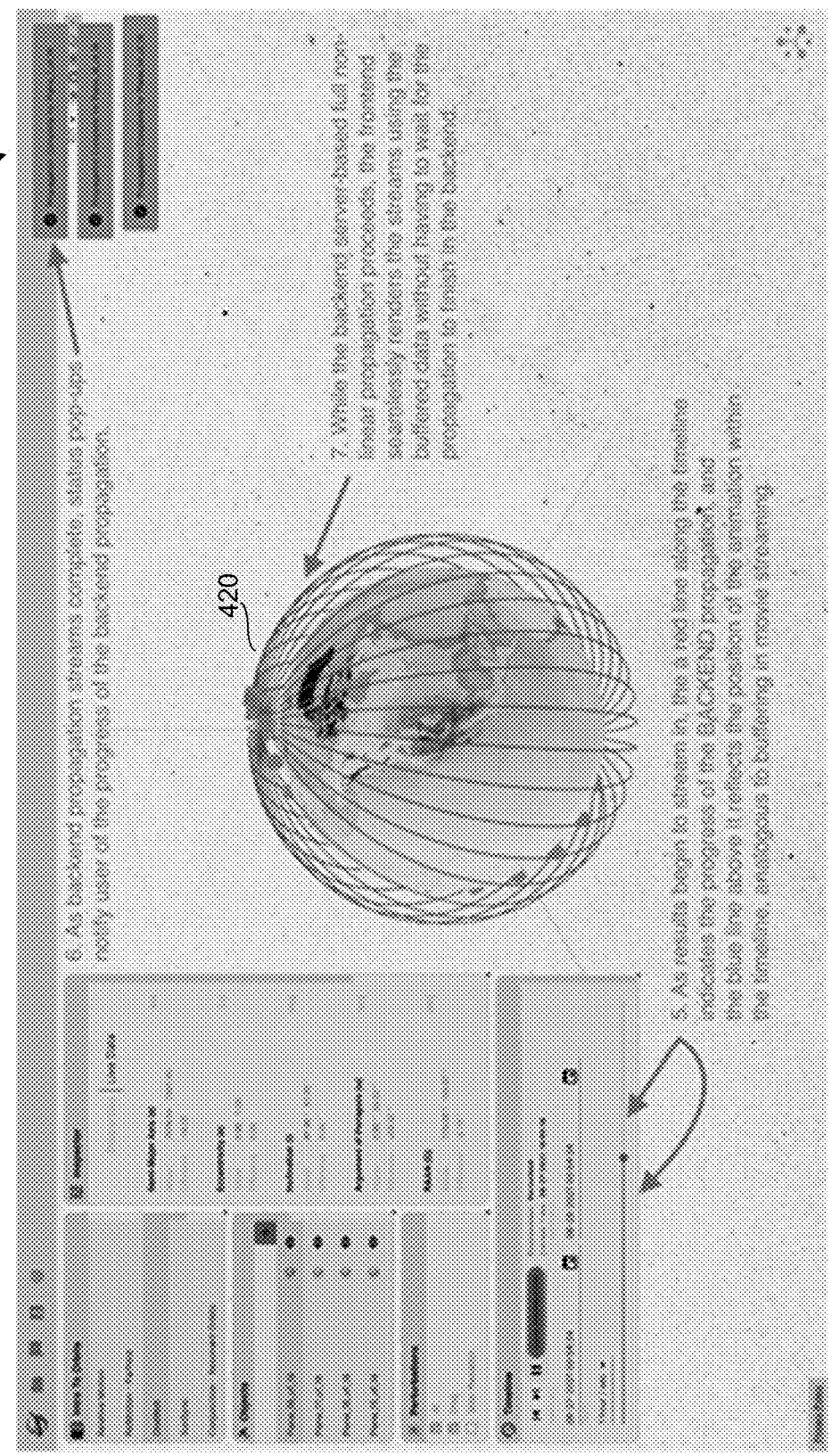
FIG. 4C illustrates another example of a graphical user interface (GUI) for configuring and receiving a buffered stream of orbital data from a backend propagator, according to some embodiments of this disclosure.
Figure 4D:
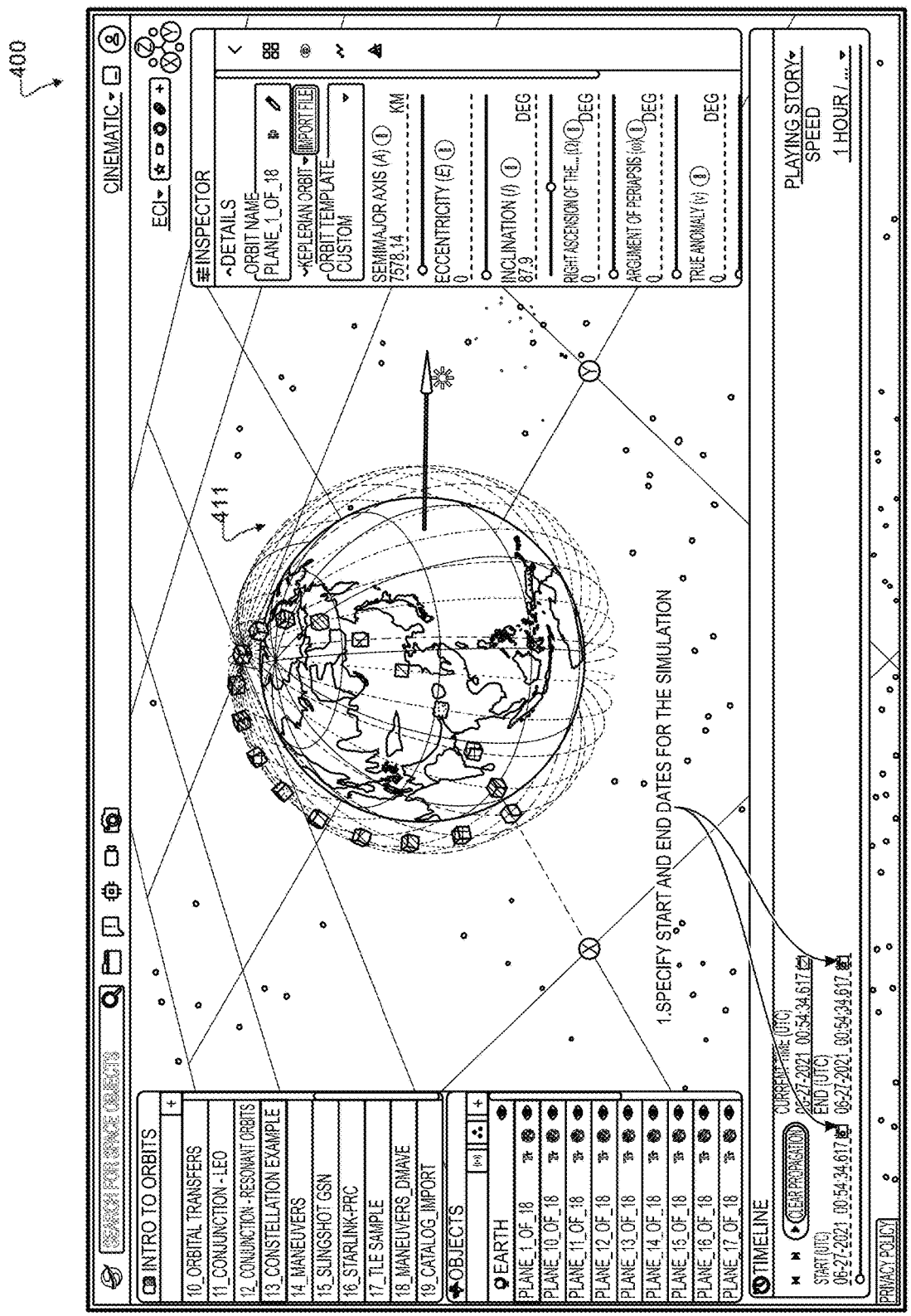
FIG. 4D illustrates another example of a graphical user interface (GUI) for configuring and receiving a buffered stream of orbital data from a backend propagator, according to some embodiments of this disclosure.
Figure 4E:
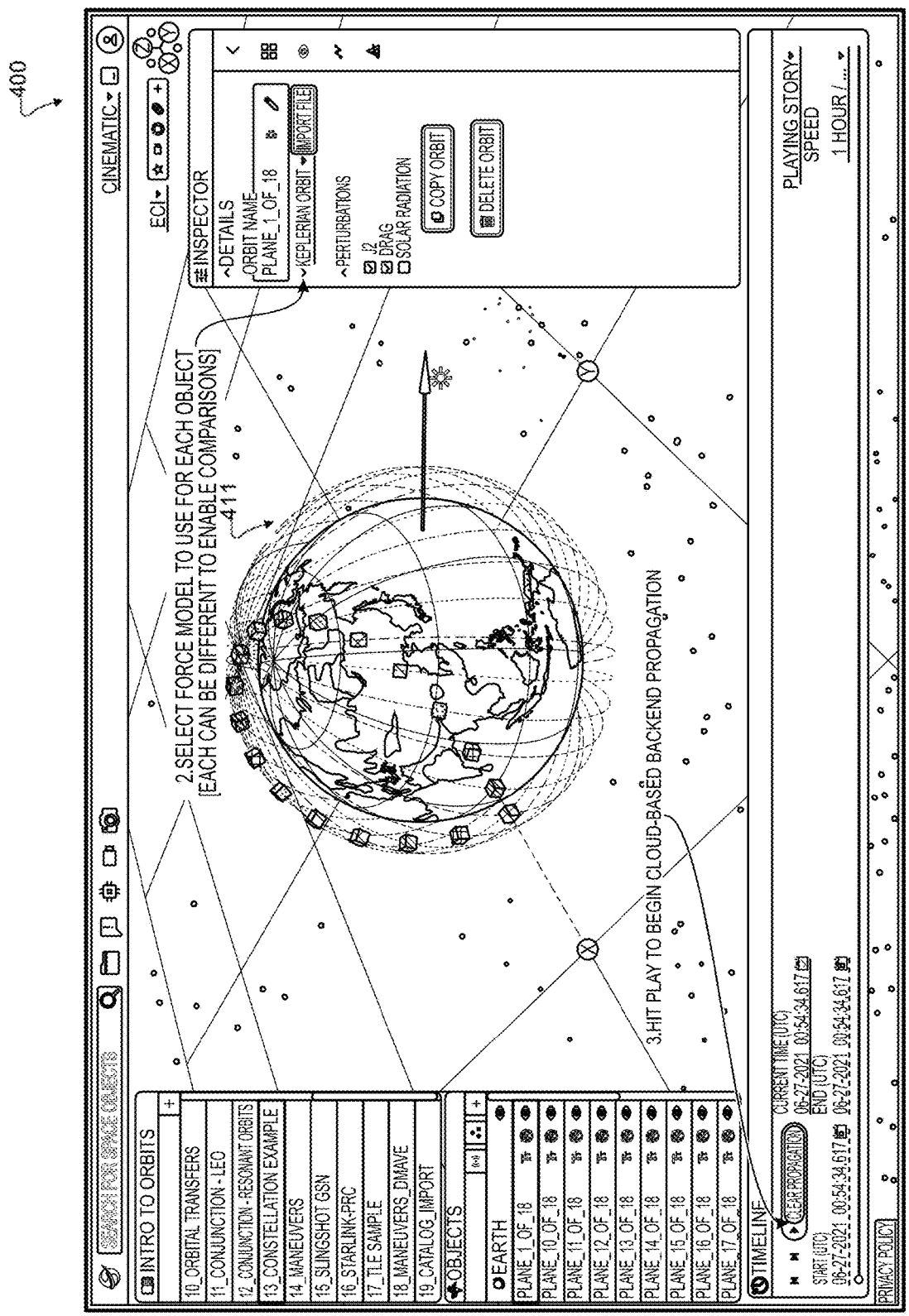
FIG. 4E illustrates another example of a graphical user interface (GUI) for configuring and receiving a buffered stream of orbital data from a backend propagator, according to some embodiments of this disclosure.
Figure 4F:
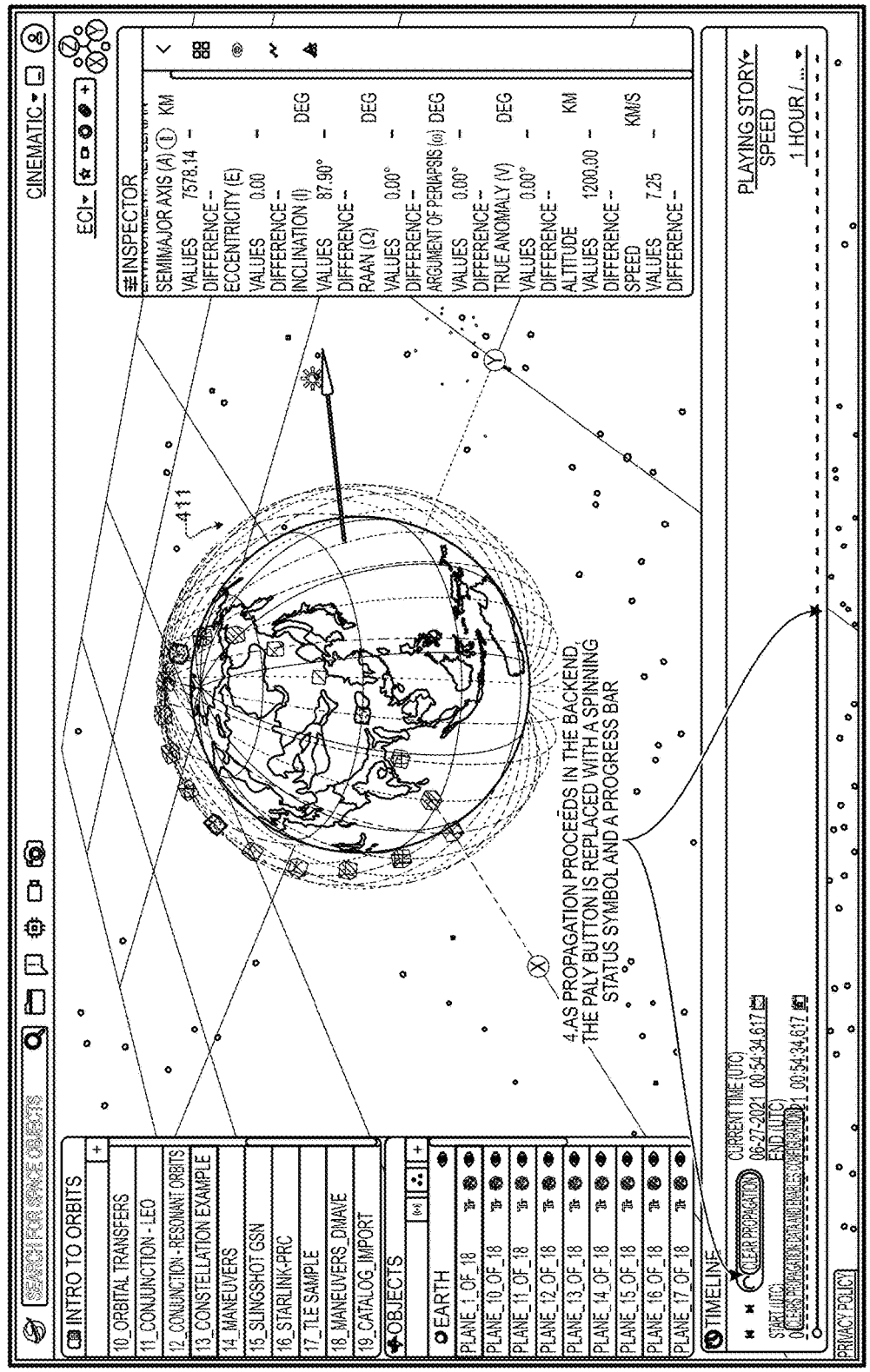
FIG. 4F illustrates another example of a graphical user interface (GUI) for configuring and receiving a buffered stream of orbital data from a backend propagator, according to some embodiments of this disclosure.
Figure 4G:
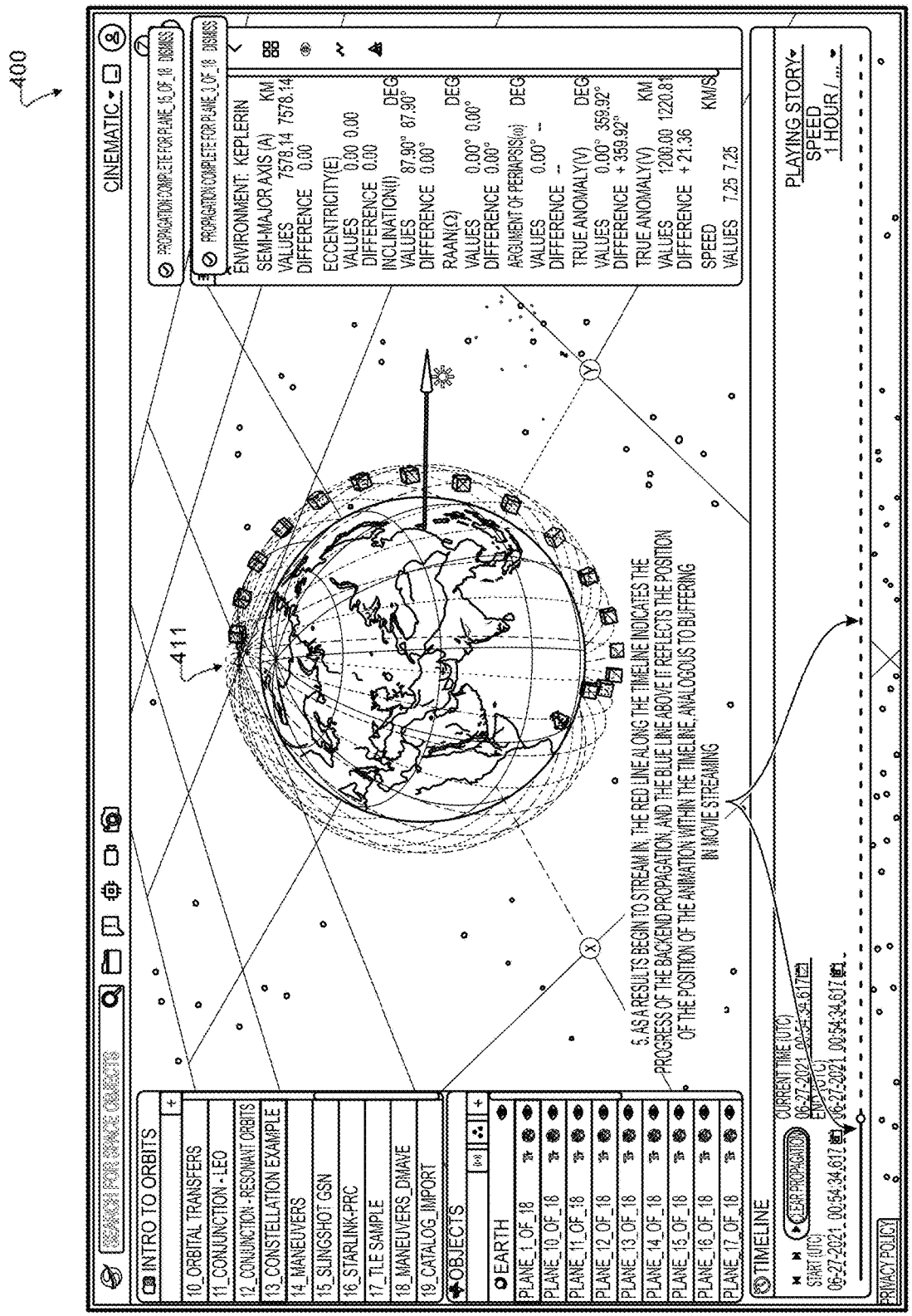
FIG. 4G illustrates another example of a graphical user interface (GUI) for configuring and receiving a buffered stream of orbital data from a backend propagator, according to some embodiments of this disclosure.
Figure 4H:
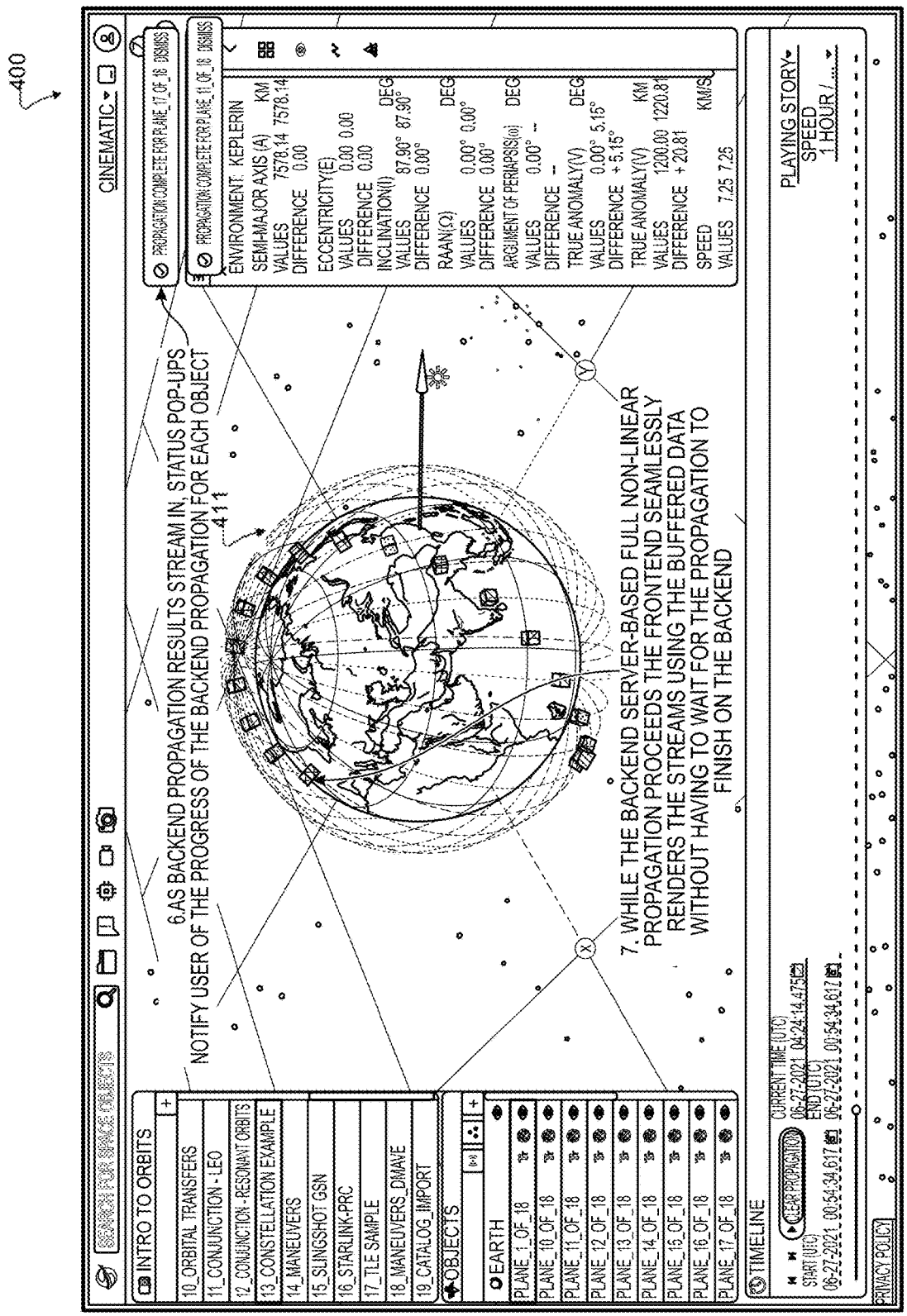
FIG. 4H illustrates another example of a graphical user interface (GUI) for configuring and receiving a buffered stream of orbital data from a backend propagator, according to some embodiments of this disclosure.

FIG. 4C illustrates an example of the GUI 400 presenting an orbital simulation based on a stream of orbital data provided to the client device (e.g., the client device 301 in FIG. 3) from the propagator. Referring to the illustrative example of FIG. 4C, this figure shows GUI 400 at a point in time subsequent to that shown in FIG. 4B. In the example of FIG. 4C, the propagator has sufficiently populated the buffer (e.g., the preprocessing and buffering stage 360 in FIG. 3) to the point where a substantially continuous (e.g., a stream sufficient for the GUI 400 to present the progress of the propagation at a steady frame rate, similar to presenting streaming video) stream of orbital data is received at the client device over a persistent connection (e.g., a WebSockets connection established through the connection API 305 in FIG. 3) with the streaming data interface.

According to various embodiments, as the stream of orbital data is received from the propagator, points between the data points contained in the stream of orbital data are interpolated (e.g., by the interpolation and estimation module 320 in FIG. 3), and a plot 420 of the orbital trajectory is calculated and rendered in near real-time at the GUI 400. According to certain embodiments, orbital data from the propagator is buffered by the streaming data interface such that, once the propagator has populated the buffer to a threshold level, streaming and rendering the plot 420 can proceed while the propagator continues to perform the simulation. In this way, certain embodiments, according to this disclosure, can minimize the latency, or wait time, between initiating a simulation by a backend propagator, and beginning to see a visualization of a fully-calculated orbit at the GUI 400.

FIGS. 4D-4H illustrate additional examples of configuring and receiving an orbital simulation at a GUI that may be the same as or similar to, with respect to at least certain elements (e.g., the locally generated orbital estimate 411), the graphic user interfaces of 4A-4C.

In some embodiments, if no changes to the orbit are made after a first propagation, all propagated orbits may be cached (e.g., by an application) in a memory (e.g., a memcache). In some embodiments, the application receives the request, which is translated into a hash key. The hash key may then be looked up inside the memory (e.g., a memcache database) to retrieve the results if present. In some embodiments, the results may be validated to ensure the results include all steps of the propagation. The first call may be a hash of the request that returns the number of steps. In some embodiments, the application may append the hash key with the number of steps to get the individual steps of the propagation. For example, a request "123" may create a hash of "dsve" that may include the number of steps of the propagation. The first call to the memory (e.g., the memcache) with the key "dsve" may return 100 steps. Subsequent calls may be made then with keys "dsve1", "dsve2", "dsve3", . . . , "dsve100". If there is no key that matches the request, the key may be sent to the propagator with the request that then streams the results to the backend and GUI. Then, at the same time, in some embodiments, in a different thread, the propagator may stream to the cache writer, which then writes the stream to the memory with the number of steps for the given propagation.

Example Method

FIG. 5 illustrates an example method 500 for configuring and receiving an orbital simulation at a client device (e.g., the client device 301 in FIG. 3), according to various embodiments of this disclosure. The method 500 can be performed at any suitable processing platform (e.g., the device 100 in FIG. 1) capable of implementing a GUI (e.g., the GUI 310 in FIG. 3) and an estimation and interpolation stage (e.g., the interpolation and estimation module 320 in FIG. 3). Examples of suitable processing platforms include, without limitation, laptop computers, tablet computers, and certain smartphones.

Referring to the non-limiting example of FIG. 5, at operation 505, a client device connected to a propagator through a streaming data interface (e.g., the streaming data interface 351 in FIG. 3) receives, through a GUI presented at the device, a user-selected configuration parameter for an orbital simulation to be calculated according to a numerical integration method at a computing platform (e.g., the server 200 in FIG. 2) operating as a backend propagator. In certain embodiments, the user-selected configuration parameter may be an orbital parameter, for example, a parameter specifying the eccentricity of a satellite's orbit around earth, or the orbital semi-major axis. In some embodiments, a user-selected computational parameter (e.g., a choice of force model) is also selected through the GUI (e.g., the GUI 400 in FIG. 4) at operation 505.

As shown in FIG. 5, at operation 510, the client device sends a first set of configuration parameters (including the user-selected configuration parameters) to the streaming data interface, which, in turn provides the first set of configuration parameters to the backend propagator. According to various embodiments, the first set of configuration parameters comprises all of the configuration parameters for the simulation (both orbital and computational) which are capable of being set at the client device. In various embodiments, one or more parameters of the first set of configuration parameters is set automatically at the client device to a determined value (which a user may, if desired, reconfigure). Examples of parameters which may be automatically set at the client device include, without limitation, a step value for calculations performed at the propagator. Responsive to receiving the first set of configuration parameters, via the streaming data interface, the propagator begins performing a numerical integration according to the specified parameters to determine points along a simulated orbit.

At operation 515, an estimated orbit is determined locally at the client device, based, at a minimum, on the user-selected configuration parameter received at the operation 505. According to certain embodiments, the estimated orbit is determined based on an analytical (e.g., not a numerical integration) force model, which considers only a subset of the configuration parameters. In contrast to the numerical integration performed by the propagator, generating the estimated orbit is computationally inexpensive and allows a preview of the simulated orbit to be quickly generated and presented on the GUI.

According to various embodiments, at operation 520, a rendering of the estimated orbit (e.g., the estimated orbit 411 in FIG. 4A) is presented through the GUI. Depending on embodiments, the operations 515 and 520 may be performed prior to the operation 510, such that a rendering of the estimated orbit is presented at the GUI as a preview of the fully-calculated orbit. In this way, the estimated orbit operates a tool to help users visualize the simulated orbit and tune the configuration parameters before sending the first set of parameters to the propagator.

As shown in FIG. 5, at operation 525, after being allowed to run for some period, the propagator sufficiently fills one or more buffers (e.g., the preprocessing and buffering stage

360 in FIG. 3) of the streaming data interface with orbital data to support a data stream from which a dynamic rendering of a fully-calculated orbit can be presented at the GUI. The stream of data may be received (e.g., through a persistent connection between the client device and the streaming data interface) at the client device. As used in this disclosure, the expression "dynamic rendering" refers to a rendering of an orbit in which the rendering is updated as new orbital data is received and interpolated at the client device. Using the systems, the methods, the computer-readable media, and the techniques described herein, the client device may provide adjustments to be made to the orbital simulation and may then receive an updated orbital simulation in response.

According to various embodiments, at operation 530, the received stream of orbital data is locally interpolated at the client device, wherein points along the orbital path between the points specified in the stream of orbital data from the propagator are determined. Finally, at operation 535, a dynamic rendering (e.g., the plot 420 in FIG. 4C) of the interpolated stream of orbital data is presented at the GUI.

Additional Considerations

While various embodiments of the invention have been shown and disclosed herein, it will be obvious to those skilled in the art that such embodiments are provided by way of example only. Numerous variations, changes, and substitutions may occur to those skilled in the art without departing from the invention. It should be understood that various alternatives to the embodiments of the invention disclosed herein may be employed.

It should be noted that various illustrative or suggested ranges set forth herein are specific to their example embodiments and are not intended to limit the scope or range of disclosed technologies, but, again, merely provide example ranges for frequency, amplitudes, etc. associated with their respective embodiments or use cases.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, hardware modules may encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). Elements that are described as being coupled and or connected may refer to two or more elements that may be (e.g., direct physical contact) or may not be (e.g., electrically connected, communicatively coupled, etc.) in direct contact with each other, but yet still cooperate or interact with each other.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

While preferred embodiments of the present invention have been shown and disclosed herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention disclosed herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Unless otherwise defined, all technical terms used herein have the same meaning as commonly understood by one of ordinary skill in the art to which the present subject matter belongs.

As used in this specification and the appended claims, "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used in this specification and the appended claims, when the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

As used in this specification and the appended claims, when the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used in this specification, "or" is intended to mean an "inclusive or" or what is also known as a "logical OR," wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. As such, any reference to "or" herein is intended to encompass "or" unless otherwise stated.

As used in this specification and the appended claims, the indefinite articles "a" or "an," and the corresponding associated definite articles "the" or "said," are each intended to mean one or more unless otherwise stated, implied, or physically impossible. Yet further, it should be understood that the expressions "at least one of A and B, etc.," "at least one of A or B, etc.," "selected from A and B, etc." and "selected from A or B, etc." are each intended to mean either any recited element individually or any combination of two or more elements, for example, any of the elements from the group consisting of "A," "B," and "A AND B together," etc.

As used in this specification and the appended claims "about" or "approximately" may mean within an acceptable error range for the value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where values are described in the application and claims, unless otherwise stated the term "about" meaning within an acceptable error range for the particular value may be assumed.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software or firmware. The functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" may include any type of computer code, including source code, object code, and executable code. The phrase "computer readable medium" may include any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium may include media where data can be permanently stored and media where data can be stored and later overwritten, such as a rewritable optical disc or an erasable memory device.

What is claimed is:

1. A method for performing an orbit simulation, comprising:
   (a) obtaining, at a client machine, a user-selected configuration parameter for the orbit simulation;
   (b) sending, from the client machine to a remote system, via a network connection, a first set of configuration parameters for the orbit simulation, wherein the first set of configuration parameters comprise the user-selected configuration parameter;
   (c) determining, at the client machine, an estimated orbit based on the user-selected configuration parameter;
   (d) presenting, at a display, a rendering of the estimated orbit;
   (e) receiving, at the client device from the remote system, via the network connection, a stream of orbital data comprising points along an orbit, wherein the points along the orbit are determined by the remote system based on the first set of configuration parameters; and
   (f) presenting, at the display, a dynamic rendering of the orbit simulation, wherein the orbit simulation is based on the stream of orbital data.

2. The method of claim 1, wherein the estimated orbit is determined analytically based on a subset of the first set of configuration parameters.

3. The method of claim 1, further comprising:
   prior to presenting the dynamic rendering of the orbit simulation at (f), interpolating, at the client machine, the stream of orbital data to generate the orbit simulation.

4. The method of claim 3, wherein interpolating the stream of orbital data to generate the orbit simulation comprises determining interpolated points along the orbit that are between the points along the orbit determined by the remote system.

5. The method of claim 1, further comprising:
   determining, by the client machine, a second configuration parameter of the first set of configuration parameters based on the user-selected configuration parameter.

6. The method of claim 5, wherein the second configuration parameter is a time step value for a propagator.

7. The method of claim 1, wherein the remote system comprises a streaming data interface and a host machine that executes a propagator, wherein the streaming data interface and the host machine are communicatively connected.

8. The method of claim 7, further comprising:
   establishing a persistent connection between the client machine and the streaming data interface via at least one of a WebSocket or remote procedure call (RPC) connection.

9. The method of claim 1, wherein the client machine comprises the display.

10. The method of claim 1, further comprising:
    obtaining, at the client machine, while the remote system is determining the points along the orbit, a second user-selected configuration parameter, wherein the second user-selected configuration parameter comprises an additional parameter of an updated orbit simulation;
    sending, by the client machine to the remote system, via the network connection, a second set of configuration parameters for the orbit simulation, wherein the second set of configuration parameters comprises the second user-selected configuration parameter;
    determining, at the client machine, a second estimated orbit based on the second user-selected configuration parameter;
    presenting, at the display, a rendering of the second estimated orbit;
    receiving, at the client machine from the remote system, via the network connection, a second stream of orbital data comprising second points along a second orbit, wherein the second points along the second orbit are determined by the remote system based on the second set of configuration parameters;
    interpolating, at the client machine, the second stream of orbital data to determine second interpolated points along the second orbit between the second points determined by the remote system; and
    presenting, at the display, a dynamic rendering of the updated orbit simulation, wherein the updated orbit simulation is based on both (i) the stream of orbital data and (ii) the second stream of orbital data.

11. The method of claim 10, wherein the second user-selected configuration parameter is associated with an in-orbit maneuver.

12. A client device for performing an orbit simulation, comprising:
    a display; and
    one or more processors configured to:
    (a) obtain a user-selected configuration parameter for the orbit simulation;

(b) send, to a remote system, via a network connection, a first set of configuration parameters for the orbit simulation, wherein the first set of configuration parameters comprise the user-selected configuration parameter;

(c) determine an estimated orbit based on the user-selected configuration parameter;

(d) cause the display to present a rendering of the estimated orbit;

(e) receive, from the remote system, via the network connection, a stream of orbital data comprising points along an orbit, wherein the points along the orbit are determined by the remote system based on the first set of configuration parameters; and (f) cause the display to present a dynamic rendering of the orbit simulation, wherein the orbit simulation is based on the stream of orbital data.

13. The client device of claim 12, wherein the estimated orbit is determined analytically based on a subset of the first set of configuration parameters.

14. The client device of claim 12, wherein the one or more processors are further configured to:
prior to causing the display to present the dynamic rendering of the orbit simulation at (e), interpolate the stream of orbital data to generate the orbit simulation.

15. The client device of claim 14, wherein interpolating the stream of orbital data to generate the orbit simulation comprises determining interpolated points along the orbit that are between the points along the orbit determined by the remote system.

16. The client device of claim 12, wherein the one or more processors are further configured to:
determine a second configuration parameter of the first set of configuration parameters based on the user-selected configuration parameter.

17. The client device of claim 16, wherein the second configuration parameter is a time step value for a propagator.

18. The client device of claim 12, wherein the one or more processors are further configured to:
obtain, while the remote system is determining the points along the orbit, a second user-selected configuration parameter, wherein the second user-selected configuration parameter comprises an additional parameter of an updated orbit simulation;

send, to the remote system, via the network connection, a second set of configuration parameters for the orbit simulation, wherein the second set of configuration parameters comprises the second user-selected configuration parameter;

determine, a second estimated orbit based on the second user-selected configuration parameter;

cause the display to present a rendering of the second estimated orbit;

receive, via the network connection from the streaming data interface, a second stream of orbital data comprising second points along a second orbit, wherein the second points along the second orbit are determined by the remote system based on the second set of configuration parameters;

interpolate the second stream of orbital data to determine second interpolated points along the second orbit between the second points determined by the remote system; and cause the display to present a dynamic rendering of the updated orbit simulation, wherein the updated orbit simulation is based on both (i) the stream of orbital data and (ii) the second stream of orbital data.

19. A method for performing an orbit simulation, comprising:

(a) obtaining, at a client machine, a user-selected configuration parameter for the orbit simulation;

(b) sending, from the client machine to a remote system, via a network connection, a first set of configuration parameters for the orbit simulation, wherein the first set of configuration parameters comprise the user-selected configuration parameter;

(c) receiving, at the client device from the remote system, via the network connection, a stream of orbital data comprising points along an orbit, wherein the points along the orbit are determined by the remote system based on the first set of configuration parameters;

(d) interpolating, at the client machine, the stream of orbital data to generate the orbit simulation; and (d) presenting, at a display, a dynamic rendering of the orbit simulation.

20. The method of claim 19, further comprising:
determining, at the client machine, an estimated orbit based on the user-selected configuration parameter; and
prior to presenting the dynamic rendering of the orbit simulation at (d), presenting, at the display, a rendering of the estimated orbit.

21. The method of claim 20, wherein the estimated orbit is determined analytically based on a subset of the first set of configuration parameters.

22. The method of claim 19, wherein interpolating the stream of orbital data to generate the orbit simulation comprises determining interpolated points along the orbit that are between the points along the orbit determined by the remote system.

23. The method of claim 19, further comprising:
determining, by the client machine, a second configuration parameter of the first set of configuration parameters based on the user-selected configuration parameter.

24. The method of claim 23, wherein the second configuration parameter is a time step value for a propagator.

25. The method of claim 19, wherein the remote system comprises a streaming data interface and a host machine that executes a propagator, wherein the streaming data interface and the host machine are communicatively connected.

26. The method of claim 25, further comprising:
establishing a persistent connection between the client machine and the streaming data interface via at least one of a WebSocket or remote procedure call (RPC) connection.

27. The method of claim 19, wherein the client machine comprises the display.

28. The method of claim 19, further comprising:
obtaining, at the client machine, while the remote system is determining the points along the orbit, a second user-selected configuration parameter, wherein the second user-selected configuration parameter comprises an additional parameter of an updated orbit simulation;

sending, by the client machine to the remote system, via the network connection, a second set of configuration parameters for the orbit simulation, wherein the second set of configuration parameters comprises the second user-selected configuration parameter;

determining, at the client machine, a second estimated orbit based on the second user-selected configuration parameter;

presenting, at the display, a rendering of the second estimated orbit;

receiving, at the client machine from the remote system, via the network connection, a second stream of orbital data comprising second points along a second orbit, wherein the second points along the second orbit are determined by the remote system based on the second set of configuration parameters;

interpolating, at the client machine, the second stream of orbital data to determine second interpolated points along the second orbit between the second points determined by the remote system; and presenting, at the display, a dynamic rendering of the updated orbit simulation, wherein the updated orbit simulation is based on both (i) the stream of orbital data and (ii) the second stream of orbital data.

29. The method of claim 19, wherein the second user-selected configuration parameter is associated with an in-orbit maneuver.

30. A client device for performing an orbit simulation, comprising:
a display; and
one or more processors configured to:
(a) obtain a user-selected configuration parameter for the orbit simulation;
(b) send, to a remote system, via a network connection, a first set of configuration parameters for the orbit simulation, wherein the first set of configuration parameters comprise the user-selected configuration parameter;
(c) receive, from the remote system, via the network connection, a stream of orbital data comprising points along an orbit, wherein the points along the orbit are determined by the remote system based on the first set of configuration parameters;
(d) interpolating the stream of orbital data to generate the orbit simulation; and
(e) cause the display to present a dynamic rendering of the orbit simulation.

31. The client device of claim 30, wherein the one or more processors are further configured to:
determine an estimated orbit based on the user-selected configuration parameter; and
prior to presenting the dynamic rendering of the orbit simulation at (e), cause the display to present a rendering of the estimated orbit.

32. The client device of claim 31, wherein the estimated orbit is determined analytically based on a subset of the first set of configuration parameters.

33. The client device of claim 30, wherein interpolating the stream of orbital data to generate the orbit simulation comprises determining interpolated points along the orbit that are between the points along the orbit determined by the remote system.

34. The client device of claim 30, wherein the one or more processors are further configured to:
determine a second configuration parameter of the first set of configuration parameters based on the user-selected configuration parameter.

35. The client device of claim 34, wherein the second configuration parameter is a time step value for a propagator.

36. The client device of claim 30, wherein the one or more processors are further configured to:
obtain, while the remote system is determining the points along the orbit, a second user-selected configuration parameter, wherein the second user-selected configuration parameter comprises an additional parameter of an updated orbit simulation;

send, to the remote system, via the network connection, a second set of configuration parameters for the orbit simulation, wherein the second set of configuration parameters comprises the second user-selected configuration parameter;

determine, a second estimated orbit based on the second user-selected configuration parameter;

cause the display to present a rendering of the second estimated orbit;

receive, via the network connection from the streaming data interface, a second stream of orbital data comprising second points along a second orbit, wherein the second points along the second orbit are determined by the remote system based on the second set of configuration parameters;

interpolate the second stream of orbital data to determine second interpolated points along the second orbit between the second points determined by the remote system; and cause the display to present a dynamic rendering of the updated orbit simulation, wherein the updated orbit simulation is based on both (i) the stream of orbital data and (ii) the second stream of orbital data.

37. A method for performing an orbit simulation, comprising:
(a) obtaining, at a client machine, a user-selected configuration parameter for the orbit simulation;
(b) establishing a network connection between the client machine and a streaming data interface via at least one of a WebSocket or a remote procedure call (RPC) connection, wherein a remote system comprises the streaming data interface and a host machine that executes a propagator, wherein the streaming data interface and the host machine are communicatively connected;
(c) sending, from the client machine to a remote system, via a network connection, a first set of configuration parameters for the orbit simulation, wherein the first set of configuration parameters comprise the user-selected configuration parameter;
(d) receiving, at the client device from the remote system, via the network connection, a stream of orbital data comprising points along an orbit, wherein the points along the orbit are determined by the remote system based on the first set of configuration parameters;
(e) presenting, at a display, a dynamic rendering of the orbit simulation, wherein the orbit simulation is based on the stream of orbital data.

38. The method of claim 37, further comprising:
determining, by the client machine, a second configuration parameter of the first set of configuration parameters based on the user-selected configuration parameter.

39. The method of claim 38, wherein the second configuration parameter is a time step value for a propagator.

40. The method of claim 37, wherein the remote system comprises a streaming data interface and a host machine that executes a propagator, wherein the streaming data interface and the host machine are communicatively connected.

41. The method of claim 37, wherein the client machine comprises the display.

42. The method of claim 37, further comprising:
obtaining, at the client machine, while the remote system is determining the points along the orbit, a second user-selected configuration parameter, wherein the second user-selected configuration parameter comprises an additional parameter of an updated orbit simulation;

sending, by the client machine to the remote system, via the network connection, a second set of configuration parameters for the orbit simulation, wherein the second set of configuration parameters comprises the second user-selected configuration parameter;

determining, at the client machine, a second estimated orbit based on the second user-selected configuration parameter;

presenting, at the display, a rendering of the second estimated orbit;

receiving, at the client machine from the remote system, via the network connection, a second stream of orbital data comprising second points along a second orbit, wherein the second points along the second orbit are determined by the remote system based on the second set of configuration parameters;

interpolating, at the client machine, the second stream of orbital data to determine second interpolated points along the second orbit between the second points determined by the remote system; and presenting, at the display, a dynamic rendering of the updated orbit simulation, wherein the updated orbit simulation is based on both (i) the stream of orbital data and (ii) the second stream of orbital data.

43. The method of claim 37, wherein the second user-selected configuration parameter is associated with an in-orbit maneuver.

44. A client device for performing an orbit simulation, comprising:

a display; and one or more processors configured to:
   (a) obtain a user-selected configuration parameter for the orbit simulation;
   (b) establish a network connection to a streaming data interface via at least one of a WebSocket or a remote procedure call (RPC) connection, wherein a remote system comprises the streaming data interface and a host machine that executes a propagator, wherein the streaming data interface and the host machine are communicatively connected
   (c) send, to a remote system, via a network connection, a first set of configuration parameters for the orbit simulation, wherein the first set of configuration parameters comprise the user-selected configuration parameter;
   (d) receive, from the remote system, via the network connection, a stream of orbital data comprising points along an orbit, wherein the points along the orbit are determined by the remote system based on the first set of configuration parameters; and
   (e) cause the display to present a dynamic rendering of the orbit simulation, wherein the orbit simulation is based on the stream of orbital data.

45. The client device of claim 44, wherein the one or more processors are further configured to:

determine a second configuration parameter of the first set of configuration parameters based on the user-selected configuration parameter.

46. The client device of claim 44, wherein the second configuration parameter is a time step value for a propagator.

47. The client device of claim 44, wherein the one or more processors are further configured to:

obtain, while the remote system is determining the points along the orbit, a second user-selected configuration parameter, wherein the second user-selected configuration parameter comprises an additional parameter of an updated orbit simulation;

send, to the remote system, via the network connection, a second set of configuration parameters for the orbit simulation, wherein the second set of configuration parameters comprises the second user-selected configuration parameter;

determine, a second estimated orbit based on the second user-selected configuration parameter;

cause the display to present a rendering of the second estimated orbit;

receive, via the network connection from the streaming data interface, a second stream of orbital data comprising second points along a second orbit, wherein the second points along the second orbit are determined by the remote system based on the second set of configuration parameters;

interpolate the second stream of orbital data to determine second interpolated points along the second orbit between the second points determined by the remote system; and cause the display to present a dynamic rendering of the updated orbit simulation, wherein the updated orbit simulation is based on both (i) the stream of orbital data and (ii) the second stream of orbital data.

48. A method for performing an orbit simulation, comprising:

(a) obtaining, at a client machine, a user-selected configuration parameter for the orbit simulation;

(b) sending, from the client machine to a remote system, via a network connection, a first set of configuration parameters for the orbit simulation, wherein the first set of configuration parameters comprise the user-selected configuration parameter;

(c) receiving, at the client device from the remote system, via the network connection, a stream of orbital data comprising points along an orbit, wherein the points along the orbit are determined by the remote system based on the first set of configuration parameters;

(d) presenting, at a display, a dynamic rendering of the orbit simulation, wherein the orbit simulation is based on the stream of orbital data;

(e) obtaining, at the client machine a second user-selected configuration parameter, wherein the second user-selected configuration parameter comprises an additional parameter of an updated orbit simulation;

(f) sending, by the client machine to the remote system, via the network connection, a second set of configuration parameters for the orbit simulation, wherein the second set of configuration parameters comprises the second user-selected configuration parameter;

(g) determining, at the client machine, a second estimated orbit based on the second user-selected configuration parameter;

(h) presenting, at the display, a rendering of the second estimated orbit;

(i) receiving, at the client machine from the remote system, via the network connection, a second stream of orbital data comprising second points along a second orbit, wherein the second points along the second orbit are determined by the remote system based on the second set of configuration parameters;

(j) interpolating, at the client machine, the second stream of orbital data to determine second interpolated points along the second orbit between the second points determined by the remote system; and (k) presenting, at the display, a dynamic rendering of the updated orbit simulation, wherein the updated orbit simulation is based on both (i) the stream of orbital data and (ii) the second stream of orbital data.

49. The method of claim 48, further comprising:
determining, by the client machine, a second configuration parameter of the first set of configuration parameters based on the user-selected configuration parameter.

50. The method of claim 49, wherein the second configuration parameter is a time step value for a propagator.

51. The method of claim 48, wherein the remote system comprises a streaming data interface and a host machine that executes a propagator, wherein the streaming data interface and the host machine are communicatively connected.

52. The method of claim 48, wherein the client machine comprises the display.

53. The method of claim 48, wherein the second user-selected configuration parameter is associated with an in-orbit maneuver.

54. A client device for performing an orbit simulation, comprising:
a display; and
one or more processors configured to:
 (a) obtain a user-selected configuration parameter for the orbit simulation;
 (b) establish a network connection to a streaming data interface via at least one of a WebSocket or a remote procedure call (RPC) connection, wherein a remote system comprises the streaming data interface and a host machine that executes a propagator, wherein the streaming data interface and the host machine are communicatively connected
 (c) send, to a remote system, via a network connection, a first set of configuration parameters for the orbit simulation, wherein the first set of configuration parameters comprise the user-selected configuration parameter;
 (d) receive, from the remote system, via the network connection, a stream of orbital data comprising points along an orbit, wherein the points along the orbit are determined by the remote system based on the first set of configuration parameters;
 (e) cause the display to present a dynamic rendering of the orbit simulation, wherein the orbit simulation is based on the stream of orbital data;
 (f) obtain, while the remote system is determining the points along the orbit, a second user-selected configuration parameter, wherein the second user-selected configuration parameter comprises an additional parameter of an updated orbit simulation;
 (g) send, to the remote system, via the network connection, a second set of configuration parameters for the orbit simulation, wherein the second set of configuration parameters comprises the second user-selected configuration parameter;
 (h) determine, a second estimated orbit based on the second user-selected configuration parameter;
 (i) cause the display to present a rendering of the second estimated orbit;
 (j) receive, via the network connection from the streaming data interface, a second stream of orbital data comprising second points along a second orbit, wherein the second points along the second orbit are determined by the remote system based on the second set of configuration parameters;
 (k) interpolate the second stream of orbital data to determine second interpolated points along the second orbit between the second points determined by the remote system; and
 (l) cause the display to present a dynamic rendering of the updated orbit simulation, wherein the updated orbit simulation is based on both (i) the stream of orbital data and (ii) the second stream of orbital data.

55. The client device of claim 54, wherein the one or more processors are further configured to:
determine a second configuration parameter of the first set of configuration parameters based on the user-selected configuration parameter.

56. The client device of claim 55, wherein the second configuration parameter is a time step value for a propagator.

57. The method of claim 54, wherein the remote system comprises a streaming data interface and a host machine that executes a propagator, wherein the streaming data interface and the host machine are communicatively connected.

58. The method of claim 54, wherein the client machine comprises the display.

59. The method of claim 54, wherein the second user-selected configuration parameter is associated with an in-orbit maneuver.

60. The method of claim 54, wherein the second user-selected configuration parameter is associated with an in-orbit maneuver.

* * * * *